A. T. HOWARD.
Odometer.
No. 28,985.
Patented July 3, 1860.
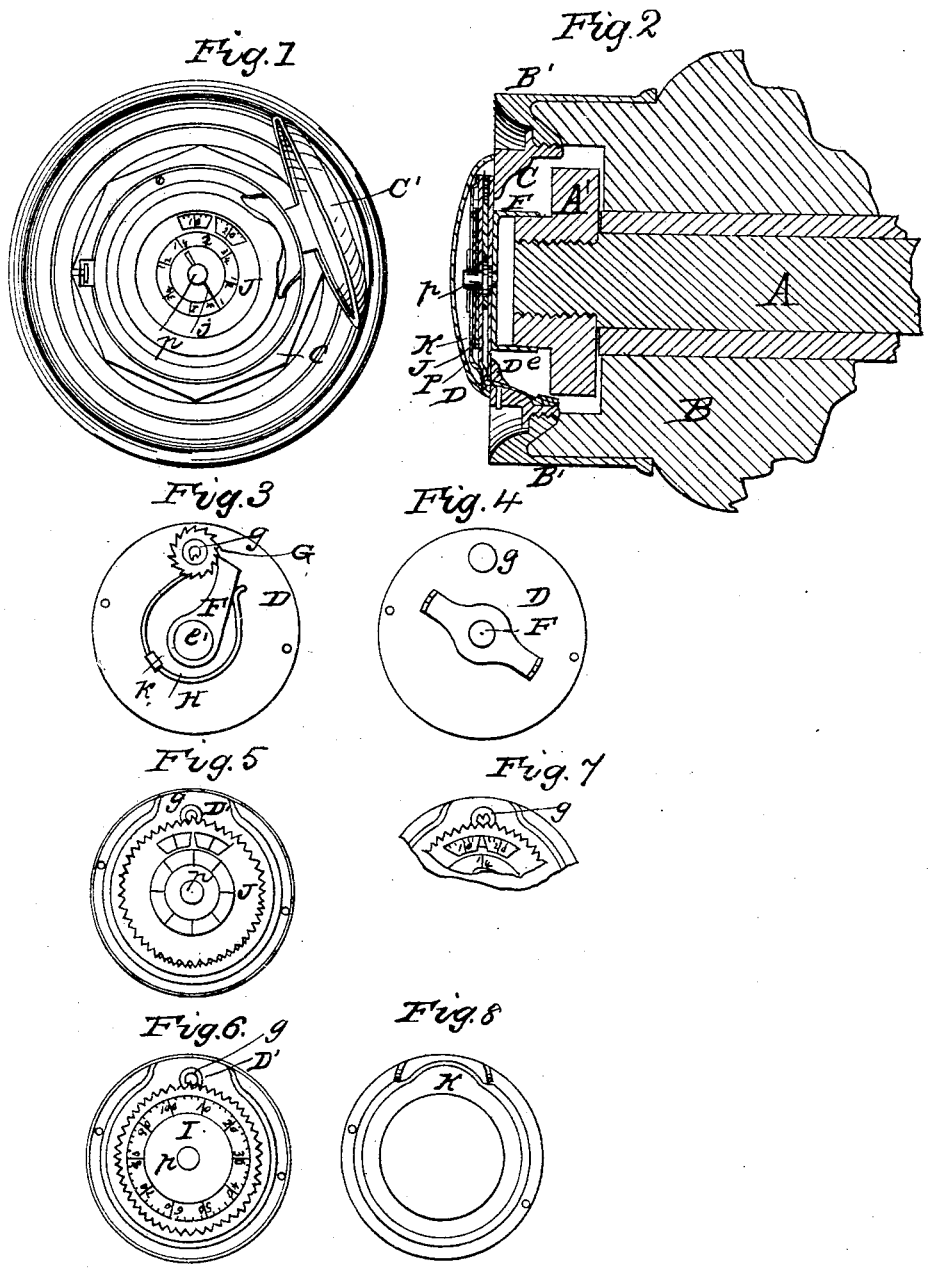
WITNESSES
W. York H. Lee
Octavius Knight
INVENTOR
Z. C. Robbins
Atty for A. T. Howard

UNITED STATES PATENT OFFICE.

ABEL T. HOWARD, OF HARTFORD, VERMONT.

ODOMETER.

Specification of Letters Patent No. 28,985, dated July 3, 1860.

*To all whom it may concern:*

Be it known that I, ABEL T. HOWARD, of Hartford, in the county of Windsor and State of Vermont, have invented a new and useful Odometer; and I hereby declare the following to be a full, clear, and exact description of the same, reference being had to the accompanying drawings, making part of this specification.

The subject of my said invention is an instrument actuated (at reduced velocity) by the motion of the carriage wheel and consisting of two concentric toothed wheels formed with unequal numbers of teeth, so that the excessive motion of one of the said wheels relatively to the other may indicate the distance traveled; and the invention particularly consists in a peculiar construction and combination hereinafter described of mechanism for actuating the said disks.

In the accompanying drawings: Figure 1— is an exterior face view of a wheel hub with the odometer attached, the hinged cap being open, exposing the scales. Fig. 2— is an axial section of the instrument with a portion of the axle and hub. Fig. 3— is a front view of the inner disk showing the eccentric pawl, ratchet wheel, spring and check, in position. Fig. 4— is a back view of the same. Fig. 5— is a face view of the instrument with the annular cap removed. Fig. 6— is a similar view with the outer toothed wheel also removed. Fig. 7— is a fragmentary view hereinafter explained. Fig. 8— is a face view of the annular cap detached.

A is the carriage axle.

A' is the nut to retain the wheel thereon.

B is the hub of the wheel and B' its band.

C is the screw cap formed with a hinged cap or lid C', which is shown open in Fig. 1.

D and D' are annular disk plates attached to the screw cap C, so as to rotate with the wheel and having between them a space to accommodate a portion of the actuating mechanism hereinafter described.

E is a small shaft journaled concentrically in the plate D, and connected with the axle or its nut by means of prongs $e$, which prevent the rotation of the said shaft, but offer no resistance to any longitudinal motion of the wheel on the axle. Its outer end is provided with an eccentric $e'$ operating a pawl F, seen in Fig. 3.

G is a ratchet wheel journaled between the plates D and D', and acted on by the pawl F.

$g$ is a cam shaped tooth projecting axially from the ratchet wheel G beyond the face of the plate D'.

H, is a spring fixed at $h$ to the plate D and operating at one end to hold the pawl F in contact with the ratchet wheel G and at the other as a detent to prevent the retrograde motion of the said wheel.

I is a toothed wheel pivoted concentrically on the exterior face of the plate D' and marked with a scale of miles.

J is a second toothed wheel working upon the same pivot as the wheel I and provided with an aperture exposing a portion of the scale of the latter and in the said aperture with an index $i$. The face of the wheel J is graduated to quarters of a mile as represented, the extent of its rotation being indicated by an index $j$ projecting from the stud $p$ upon which the wheels I and J rotate.

K is an annular cap screwed to the plates D and D' so as to cover and confine the peripheries of the wheels I and J, but expose the scales thereon.

In the present illustration the wheel I is formed with fifty teeth, the wheel J with forty-nine, and the ratchet wheel G with fifteen, the parts being proportioned and graduated to adapt the instrument to a carriage wheel making 375 revolutions per mile.

The operation is as follows: At every rotation of the carriage wheel the pawl F, by reason of the eccentricity of its pivot, receives a reciprocating motion which acting upon the ratchet wheel G, moves the same one tooth, and at every complete rotation of the ratchet wheel G the tooth $g$ moves the wheels I and J one tooth, the extent of motion of the wheel J being indicated on its scale by the index $j$. The smaller number of teeth in the periphery of the wheel J, necessarily impart to it a movement in excess of that of the wheel I, so that fifty revolutions of the ratchet wheel G produce precisely one revolution of the wheel I but of the wheel J one tooth more than a complete revolution. This excessive motion indicated upon the scale of the wheel I by the index $i$, attached to the wheel J, records the number of miles traveled.

The tooth $g$ engages between the teeth of the wheels I and J as shown in Fig. 7, so as to effectually prevent any motion of the said wheels other than that imparted to them as above described.

This instrument combines the important advantages of efficiency, cheapness, simplicity, durability and nonliability to derangement.

The following is what I claim as new and of my invention herein:—

1. The cam shaped tooth $g$ constructed and combined with a toothed wheel in the manner described, to impart an intermittent motion to the said wheel and prevent its rotation at other times.

2. The combination and arrangement of the plate D, eccentric pawl F, and ratchet wheel G, for the purposes set forth.

The above specification of my improved odometer signed and witnessed this 22nd day of February 1860.

A. T. HOWARD.

Witnesses:
Z. C. ROBBINS,
THOMAS C. DONN.